United States Patent
Canini et al.

(10) Patent No.: US 7,095,128 B2
(45) Date of Patent: Aug. 22, 2006

(54) METHOD AND DEVICE FOR REGULATING A WIND MACHINE

(75) Inventors: Jean-Marc Canini, Aibes (FR); Yves Milet, Solre le Chateau (FR); Patrick Brutsaert, Recquignies (FR)

(73) Assignee: Jeumont S.A., Courbevoie (FR)

( * ) Notice: Subject to any disclaimer, the term of this patent is extended or adjusted under 35 U.S.C. 154(b) by 0 days.

(21) Appl. No.: 10/468,723

(22) PCT Filed: Feb. 4, 2002

(86) PCT No.: PCT/FR02/00421

§ 371 (c)(1),
(2), (4) Date: Aug. 22, 2003

(87) PCT Pub. No.: WO02/068819

PCT Pub. Date: Sep. 6, 2002

(65) Prior Publication Data

US 2004/0075278 A1     Apr. 22, 2004

(30) Foreign Application Priority Data

Feb. 23, 2001  (FR) .................................. 01 02519

(51) Int. Cl.
*H02P 9/00* (2006.01)
*F03D 7/00* (2006.01)

(52) U.S. Cl. ........................................ 290/44; 310/111
(58) Field of Classification Search .................. 290/43, 290/40 A
See application file for complete search history.

(56) References Cited

U.S. PATENT DOCUMENTS

| | | | | |
|---|---|---|---|---|
| 5,225,712 A | * | 7/1993 | Erdman | 290/44 |
| 5,526,252 A | * | 6/1996 | Erdman | 363/41 |
| 5,625,539 A | * | 4/1997 | Nakata et al. | 363/17 |
| 6,137,187 A | | 10/2000 | Mikhail et al. | |
| 6,256,212 B1 | * | 7/2001 | Wobben | 363/40 |
| 6,285,090 B1 | * | 9/2001 | Brutsaert et al. | 290/55 |
| 6,380,655 B1 | * | 4/2002 | Ide et al. | 310/211 |
| 6,566,764 B1 | * | 5/2003 | Rebsdorf et al. | 290/44 |
| 6,906,431 B1 | * | 6/2005 | Wobben | 290/44 |

FOREIGN PATENT DOCUMENTS

| | | |
|---|---|---|
| DE | 198 44 258 A1 | 3/2000 |
| JP | 2005218229 A * | 8/2005 |
| NL | WO 00/36298 * | 6/2000 |
| WO | 9840627 A1 * | 9/1998 |
| WO | WO-00/36298 | 6/2000 |

OTHER PUBLICATIONS

G.A. Smith et al., A New Class of Converters for Variable Speed Wind Turbines, University of Leicester, 1993.*

* cited by examiner

*Primary Examiner*—Joseph Waks
(74) *Attorney, Agent, or Firm*—Connolly Bove Lodge & Hutz LLP

(57) ABSTRACT

A method and corresponding apparatus for regulating a system that produces electric power, the system including an electric alternator having a rotor integral with a rotating part of a wind machine to form a rotary assembly, and a power electronics module, the method including the steps of: producing an alternating current at output terminals of the alternator; converting the alternating current produced by the alternator into modulated pulses of direct current. Alternating electric current produced by the alternator is regulated by controlling the speed of rotation of the rotary assembly by resisting torque imposed by the alternator in response to modulating the pulses of continuous current produced by the converted the alternating current.

21 Claims, 6 Drawing Sheets

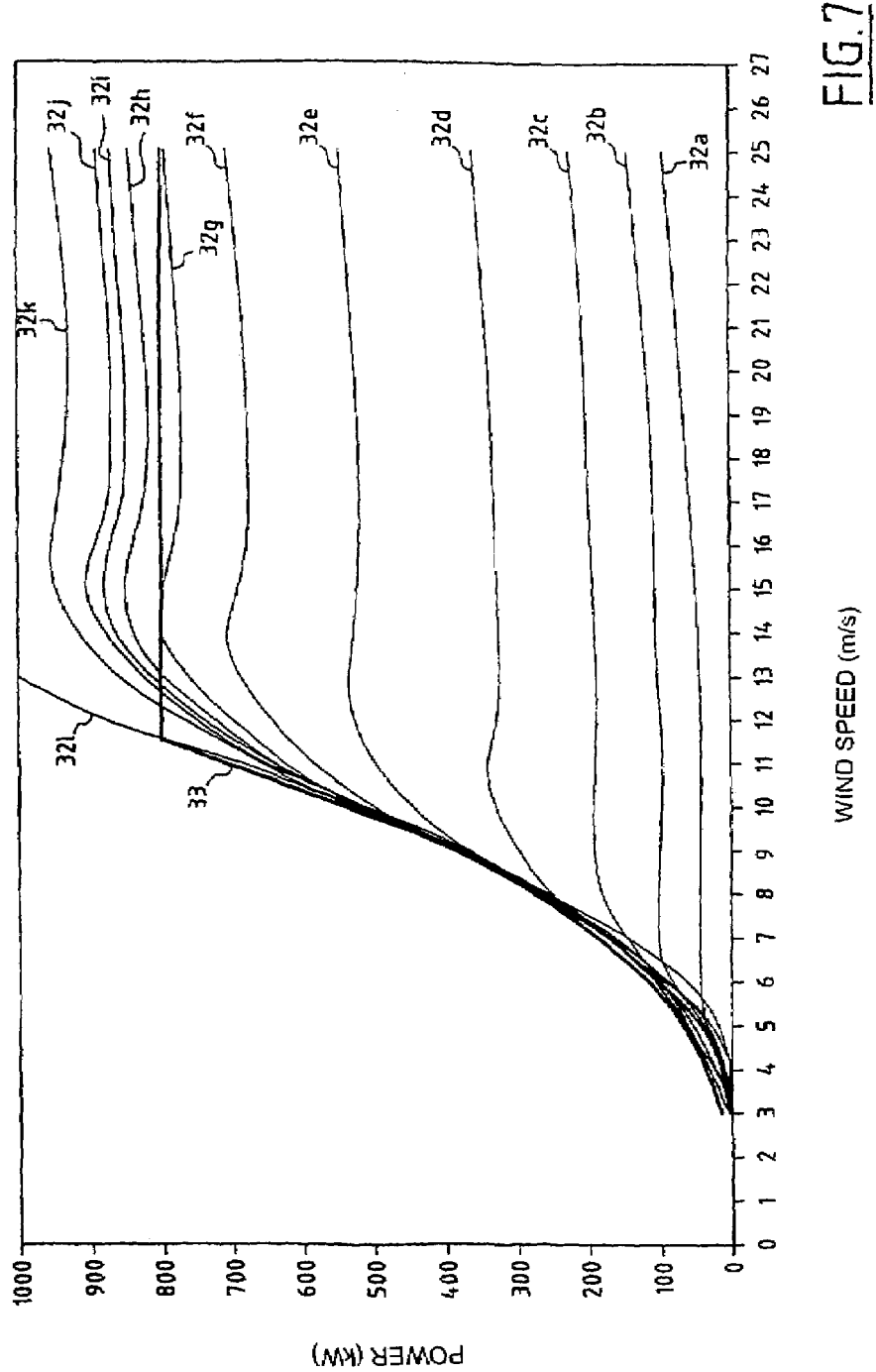

METHOD AND DEVICE FOR REGULATING A WIND MACHINE

FIELD OF THE INVENTION

The invention relates to a method of regulating operating parameters of an installation for producing electric power comprising a wind machine and a device for carrying out the method.

BACKGROUND OF THE INVENTION

Installations are known for producing electric power from wind power which comprise an alternator of which the rotor is driven by a rotating part of a wind machine having a hub and blades fixed on the hub.

In particular wind machines have been proposed in which the rotating part is connected directly to the rotor of the alternator without intermediate mechanical transmission. Such wind machines have the advantage of a greater mechanical simplicity, the rotating assembly comprising the rotating part of the wind machine integral with the rotor of the alternator being mounted so as to rotate on the structure of the wind machine via at least one block which may consist of one single bearing, in an advantageous embodiment.

Furthermore, the elimination of mechanical elements such as reducers with gears is reflected in a reduction in the costs of construction and of maintenance of the wind machine. Also the risks of breakdowns and deterioration of certain parts of the wind machine, for example by seizing of the gearing of a reducer, are avoided. However, the drawbacks of a direct connection between the rotating part of the wind machine and the rotor of the alternator are that the alternator must be able to operate in a satisfactory manner at a low speed of rotation and that the variable atmospheric conditions in which the wind machine functions, in particular the wind speed, can bring about variations in the electrical parameters of the current supplied by the wind machine to an electric network, these variations being generally unacceptable.

A particularly advantageous embodiment of the alternator of a wind machine used for the production of electric current uses an alternator rotor having permanent magnets generally disposed in a field rotating in the axial direction produced by the windings of a stator disposed facing the rotor. The alternator has a generally discoid shape, the magnets of the rotor and the windings of the stator being distributed circumferentially over surfaces in the form of discs.

French patent application FR-97 02808 filed by JEUMONT INDUSTRIE and FRAMATOME proposes the use of such a discoid alternator, the advantages of which have been indicated in the description of the patent application, for the production of electric power by such a wind machine.

So as to obtain an electric current which is stable and of good quality over the network supplied by the wind machine, it has also been proposed in the French patent application to associate with the alternator a power electronics module including a first ac-dc converter, such as a rectifier, and a second dc-ac converter, such as an inverter, which are intended to supply a stable alternating current of good quality to the network supplied by the wind machine.

The conversion of the alternating current produced by the alternator of the wind machine into direct current and the conversion of the direct current obtained into alternating current in effect permit freedom from the variations of operation of the wind machine due to the atmospheric variations and make it possible to supply the network with a current having a perfectly constant frequency (for example 50 Hz) with a very good control of the voltage and of the power factor of the supplied current.

However, in the French patent application there is no description of means permitting regulation of all the operating parameters of the wind machine, whether these parameters relate to the electrical operation of the alternator or are constituted by the speed of rotation of the rotary assembly of the wind machine.

A first problem which is posed within the framework of operation of the wind machines relates to the protection of the rotary assembly comprising the blades and the hub of the wind machine when the wind is very strong and reaches speeds which are likely to bring about racing of the wind machine and deterioration of the rotary assembly and/or the bearings of this rotary assembly.

The wind machines must be produced in such a way as to ensure disengagement of the rotating part when the wind speed exceeds a certain level; the performance of the blades of the rotary assembly then becomes very poor and racing is avoided.

In the disengagement zone the increase in the power of the wind is compensated for by a reduction in the performance of the blades; therefore the power is roughly constant.

An automatic disengagement is obtained for a certain wind speed due to the profiling of the blades of the rotary assembly and a speed of rotation which is imposed upon this rotary assembly. Such automatic disengagement systems may be designated as "stall" systems and generally comprise a rotary assembly in which the blades are mounted fixed on the hub.

Other systems, designated generally as "pitch" systems, use a rotary assembly in which the blades are mounted so as to turn on the hub about an axis perpendicular to the axis of rotation of the rotary assembly, generally by means of a bearing which ensures the rotary mounting of the foot of the blade, the device further comprising mechanical means which ensure the adjustment of the setting angle of the blade on the hub. These mechanical means are generally controlled in such a way that the setting angle of the blade is adjusted continuously during the operation of the wind machine. In the case of a wind of which the speed exceeds a predetermined speed limit, the system ensures the disengagement of the rotary assembly.

The "stall" system has the drawback of being definitely adjusted when the mounting of the blades on the hub of the rotary assembly has been ensured, as the disengagement is always effected for a predetermined wind speed.

In fact, the regulation of the wind machine is carried out in such a way that the rotary assembly turns at a nominal speed which is combined with the wind speed to cause disengagement in conditions which can only be changed by modification of the mounting of the blades on the hub in order to vary the setting angle by pivoting the blades about their longitudinal axis. This operation of changing the setting angle of the blades must be carried out manually and necessitates stopping of the wind machine during a period which may be relatively long and the intervention of staff responsible for this operation on the rotating part of the wind machine.

Independently of the problems due to the disengagement by strong wind, it is desirable to adapt the setting angle of the blades to the climatic conditions in such a way as to obtain the best possible recovery of the wind power. Such an adaptation must be carried out as a function of the climatic variations and, in particular, it is necessary to modify the setting of the blades in order to change from hot-weather operation (summer) to cold-weather operation (winter).

In fact the cold winter air is denser than in summer, when the air is warmer and lighter. Therefore the wind is more powerful during winter, such that it is desirable to modify the setting of the blades of the wind machines when the season changes. Such operations are ponderous and are reflected in operational losses both in terms of supply and sale of electric current. Provision may therefore be made not to modify the setting of the blades but, in this case, the wind machine must be dimensioned for operation in the winter period, which involves a loss of operation in the summer period.

It is common to provide two different modes of coupling of the electric generator permitting it to function at two different nominal speeds of rotation of the rotary assembly of the wind machine.

However, each of these two operating speeds is only adapted to one wind speed and, outside these ideal conditions, the power output of the wind machine is dissipated all the more as the conditions deviate from the ideal operating conditions.

Another drawback of the wind machines in which the blades have a fixed setting and which operate according to the fixed-speed "stall" system is that it is necessary to reach the nominal speed of rotation of the wind machine before connecting the generator to the network in order to avoid connection in conditions which are unacceptable for the network. It is therefore necessary to reach a sufficient level of power in order to start to exploit the wind machine for the supply of current.

The systems of the "pitch" type in which the blades are mounted with a continuously adjustable setting angle on the hub have appreciable advantages relative to the device operating according to the fixed-speed "stall" system. In particular, these systems permit operation at fixed speed or at variable speed and permit coupling to the network for low wind speeds. However, such systems are extremely fragile due to the mounting of the blades by means of a bearing and the use of a chain for regulation of the setting angle. A concentration of forces is produced on the blades, at the level of the bearing, and, due to the fact that the angles of rotation of the blades necessary for the setting are generally small, the bearing tracks undergo marking in the zone of contact with the bearing elements.

The setting angle regulating chain must include a means for control of the displacement of the blades which may be of the hydraulic, electric or electromechanical type. Such controls have a dynamic which is reflected in a relatively slow action of the regulating chain. Therefore the orientation of the blades is not always at the ideal value necessitated by the operating conditions. For this reason, in certain phases insufficient power is recovered or, on the contrary, excessive power is recovered, which brings with it drawbacks in the operation of the mechanical or electrical transmission of power.

The rotary assemblies of the wind machines must, on the other hand, be produced in such a way that complementary braking of the wind machine can be ensured, for example by normal stopping or accidental stopping, in combination with a mechanical braking system disposed on a shaft of the rotating part. Therefore the rotating part must include a braking device, generally of the aerodynamic type.

In the case of a fixed-speed "stall" system, a braking element is provided on the free end of the blades which is oriented in such a way as to ensure aerodynamic braking.

In the case of a "pitch" system, the braking can be effected by feathering of the blades by means of the setting angle regulating chain.

In one or the other case, when a micro-cutoff appears on the network, that is to say a cutoff of the circulation of the electric current lasting typically less than a second, stopping of the wind machine must be commanded, by braking, in order to avoid any risk of deterioration of the electric generator. Following the stoppage, it is necessary to provide a procedure for restarting so that this mode of operation with stopping of the wind machine is reflected in a loss of production and fatigue of the mechanical elements of the wind machine and in particular of the mechanical brake used for stopping and of the blades.

The electrical networks which ensure the distribution of current to users require the voltage and the frequency of the current supplied to be as constant as possible; in the case of a network supplied by a wind machine the said voltage and frequency depend upon the speed of rotation of the generator and thus of the wind machine.

In the case where it is necessary to provide a wind machine for a network using a frequency different from the usual frequency (for example 60 Hz instead of 50 Hz), it is necessary to modify the generator (and possibly a multiplier) in order to adapt them to the required frequency.

In the case of a network in which the frequency is not very stable and varies relative to the predetermined nominal frequency, it is necessary to adapt the operation of the wind machine.

If the frequency required on the network is higher than the predetermined frequency, the speed of rotation of the wind machine must increase and consequently the power supplied increases.

If the frequency required on the network decreases, the speed of rotation of the wind machine decreases and therefore the power supplied decreases.

The power of the wind machine is not perfectly controlled, and for this reason it is necessary to provide oversizing of the wind machine in order to meet all the demands, which involves additional costs.

Finally, the rotary assembly of the wind machine does not turn at a perfectly constant speed and undergoes periodic variations due to the passage of the blades of the rotary assembly in front of the mast supporting the nacelle on which the rotary assembly is mounted. Therefore the current generator does not turn at a perfectly regulated speed ensuring perfectly stable and constant operation.

BRIEF DESCRIPTION OF THE INVENTION

The object of the invention, therefore, is to propose a method of regulating an installation for producing electric power comprising an electric alternator having a rotor integral with the rotating part of a wind machine in order to constitute a rotary assembly, and a power electronics module including a means for converting the alternating current produced by the alternator into direct current, this method making it possible to remedy the different drawbacks of the previous systems which have been described above.

For this purpose the electrical characteristics (intensity, voltage, phase difference of intensity/voltage and frequency) of the electric current produced by the alternator and the speed of rotation of the rotary assembly are regulated by modulation of the continuous current produced by the conversion means of the power electronics module starting from the electric current produced by the alternator.

In a preferred manner:

in a first phase of operation of the installation for producing electrical energy, for low wind speeds, the speed of rotation of the rotary assembly of the wind machine is made to increase in such a way that the speed of rotation passes progressively from a low starting value to a maximum value, the torque on the rotor increasing according to a predetermined law of speed/torque variation;

according to a first embodiment of the invention, in a second phase, when the wind speed is higher than a first threshold value the speed of rotation of the rotary assembly of the wind machine is regulated at a fixed maximum value, or nominal value, enabling optimum recovery of power by the wind machine to be obtained;

in this case, preferably, the nominal value of the speed of rotation is fixed at a value taken from amongst at least two values as a function of climatic conditions at the site of the wind machine and in particular at a first value in the summer period and at a second value in the winter period;

according to a second embodiment of the invention, in a second phase of operation of the wind machine, when the wind speed is higher than a second threshold value the maximum speed of rotation of the rotary assembly of the wind machine is regulated in such a way as to maintain the power of the wind machine at a fixed value and, preferably, at the maximum power value acceptable by the wind machine;

in this case, preferably, when the value of the wind speed is lower than the second threshold value the speed of rotation of the rotary assembly is made to increase in a progressive and regulated manner and the variations in the value of the speed of rotation are recorded in such a way that the curve representing the variation of the speed of rotation can be used subsequently to control the increase in speed of the rotary assembly.

The invention also relates to a regulating device consisting of a power electronics module and a regulating and control unit which enables the method of regulation according to the invention to be carried out.

In order to aid understanding of the invention, a description will now be given, by way of example and with reference to the accompanying drawings, of a wind machine for producing electric power and of the implementation of a method of regulation according to the invention in various cases of operation of the wind machine.

BRIEF DESCRIPTION OF THE FIGURES

FIG. 7 is a diagram giving the power supplied by the wind machine as a function of the wind speed for different speeds of rotation of the rotating part.

FIG. 1 shows the nacelle of a wind machine designated in general by the reference numeral 1 which is mounted so as to rotate, by means of a rolling bearing 2 with a vertical axis, on the upper part of the mast 3 of the wind machine.

DETAILED DESCRIPTION OF THE INVENTION

Figure 1:
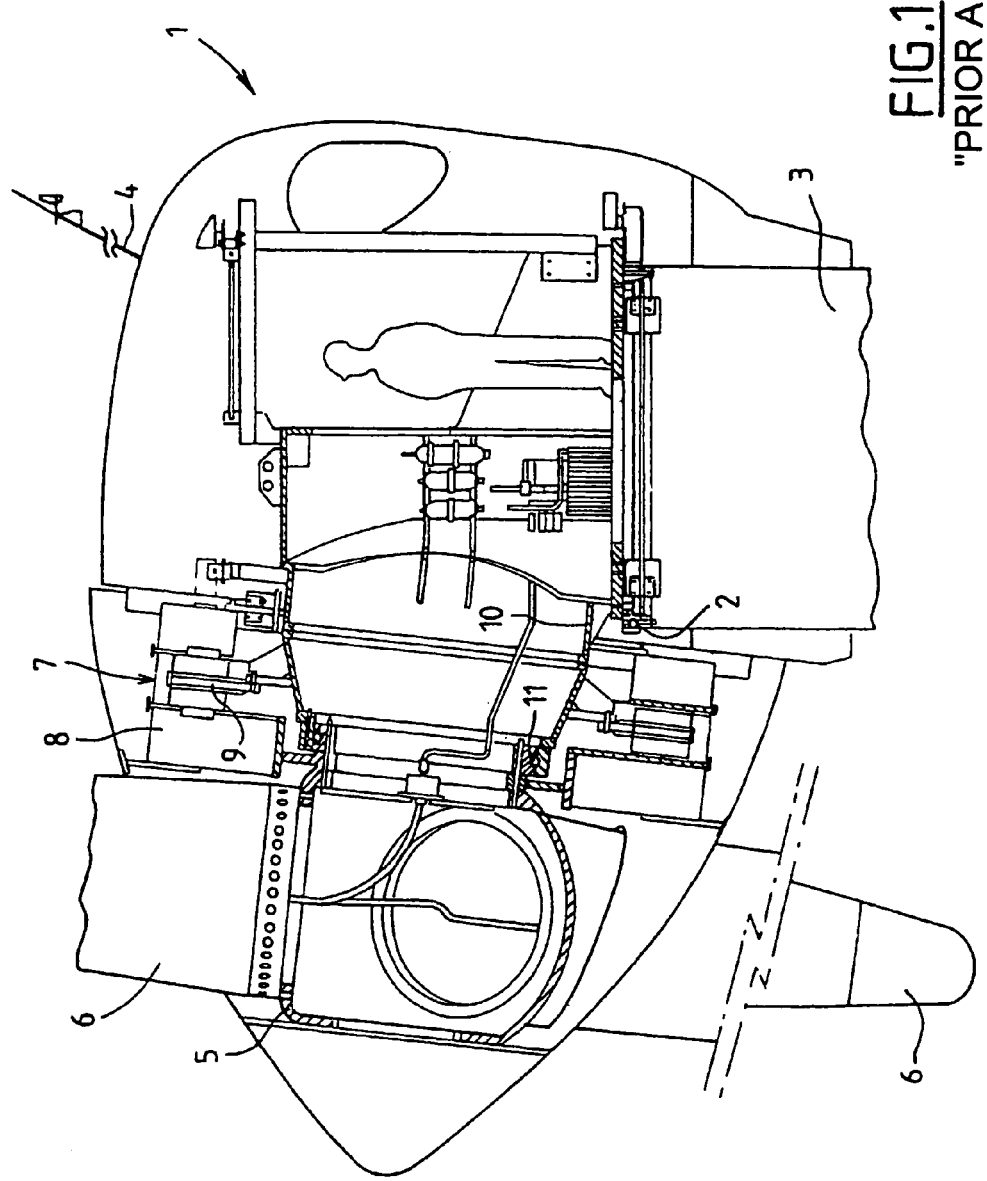
FIG. 1 is a schematic sectional view through a vertical plane of the nacelle of a wind machine for producing electric power.

An antenna 4 bearing a wind telltale permits control of a motor for orientation of the nacelle 1 of the wind machine about the vertical axis of the mast 3 in order to orient it relative to the direction of the wind at any moment.

The nacelle 1 of the wind machine bears the rotary assembly of the wind machine which includes in particular a hub 5 on which three blades 6 having a profiled section are fixed in a rigid manner.

The rotating part of the wind machine comprising the hub 5 and the blades 6 ensures that the rotor 8 of an electric current generator 7 is set in rotation, this electric current generator having a stator 9 fixed on a structural part 10 of the nacelle 1 integral with a platform mounted so as to rotate on the end of the mast 3 by means of the horizontal bearing 2.

The rotor 8 and the stator 9 of the alternator 7 are produced in discoid form, the rotor 8 having two rotor elements placed on either side of the stator, each of the rotor elements having an active face in the form of a disc bearing magnets distributed along the circumference of the disc. The stator 9 has two stator elements each having a discoid face on which are fixed coils which are distributed circumferentially, each discoid face of a stator element being directed towards the corresponding discoid face provided with permanent magnets of an element of the rotor 8.

In a typical manner, each of the rotor discs can have ninety magnets distributed circumferentially.

The rotary assembly of the wind machine comprising the rotating part of the wind machine and the rotor 8 of the alternator 7 is mounted so as to rotate on the fixed structure 10 of the nacelle 1 by means of a single rolling bearing 11 having an axis slightly inclined relative to the horizontal direction.

The windings of the stator 9 are connected electrically to connecting means which permit the current supplied by the wind machine to be sent over a utilization network by means of a power electronics module which can be disposed at least partially in the interior of the nacelle 1.

Figure 2:
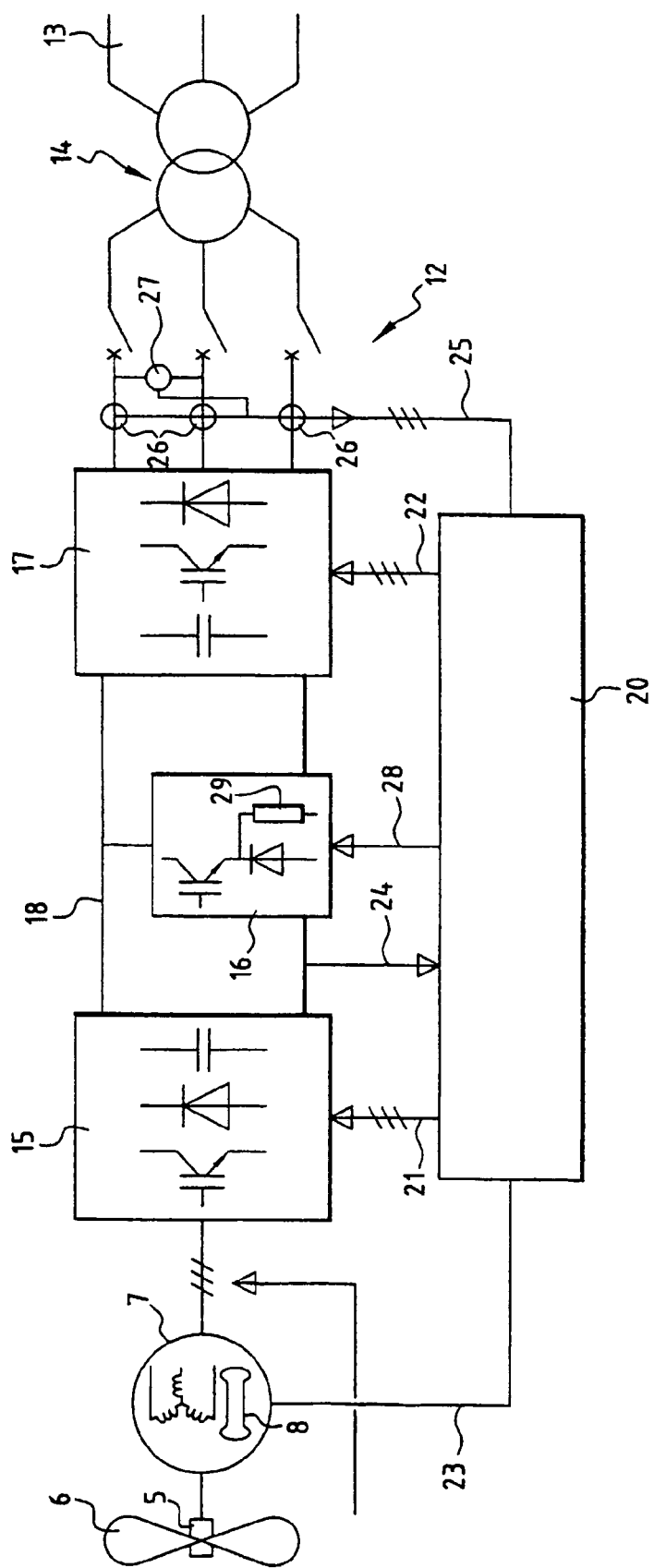
FIG. 2 is a schematic view of the electrical part of the wind machine including in particular a power electronics module.

FIG. 2 shows schematically the power electronics module which is designated generally by the reference numeral 12 and permits recovery of the electric current produced at the output of the alternator 7 of which the rotor 8 is driven in rotation by the rotating part 5, 6 of the wind machine and permits the supply to an electric utilization network 13 of an alternating electric current via a transformer 14.

The current produced by the alternator 7 and the current supplied to the network are three-phase alternating currents.

Each of the phases at the output of the alternator 7 is connected to the input of the power electronics module and each of the phases of the three-phase current at the output of the power electronics module is connected to the input of the transformer 14.

The power electronics module designated generally by the reference numeral 12 comprises in succession a rectifier 15 which ensures the conversion of the alternating current produced by the alternator into direct current, a rheostatic chopper 16 and an inverter 17.

The rectifier 15 and the inverter 17 are connected to one another by a direct current bus 18 joining the output of the rectifier 15 to the input of the inverter 17. The rheostatic chopper 16 is mounted in parallel on the bus 18, between the rectifier 15 and the inverter 17.

The rectifier 15 is a pulse width modulating (PWM) rectifier which permits modulation of the width of the direct current pulses produced from the alternating current of the alternator 7, the period of the direct current pulses being constant and for example equal to 1000 Hz.

The rectifier 15 comprises three processing stages each connected to a phase of the alternator 7 and each having two insulated gate bipolar transistors (IGBT), each of the IGBT transistors being controlled in such a way as to ensure or prohibit the passage of the current of the different alternations of the three phases of the alternating current of the alternator 7.

FIG. 2 shows a digital control and regulating unit 20 which permits control of each of the IGBT transistors of the PWM rectifier 15. All of the controls of the transistors of the pulse width modulating rectifier 15 are represented in the form of the arrow 21.

The inverter 17 is produced in a form analogous to that of the rectifier 15 and the arrangement of its components is the reverse of that of the rectifier 15, in such a way that it can transform a direct current by modulated pulses into a three-phase alternating current having a perfectly controlled voltage and frequency and that it is thus possible to supply to the network 13 via the transformer 14 a three-phase alternating current having perfectly fixed voltage and frequency, this frequency being for example 50 Hz for distribution over the French network.

The inverter 17 is controlled by the digital control and regulating module 20, as shown schematically by the arrow 22.

The control and regulating module 20 receives as input data coming from the alternator 7 (input symbolized by the connecting line 23) the intensity I and the voltage U of the electric current in each of the phases at the output of the alternator 7 as well as the speed of rotation co of the rotor of the alternator which is measured by a rotation measuring device of a known type.

The measurements reach the control and regulating module 20 in the form of signals. It should be noted that the speed of rotation co of the rotor is also the speed of rotation of the rotating part 5, 6 of the wind machine.

The control and regulating module 20 also receives, as shown schematically by the arrow 24, a signal representing the direct current voltage in the bus 18.

On each of the phases at the output of the inverter 17 there is disposed a means 26 for measuring the intensity of the current of the corresponding phase, and between two phases at the output of the inverter 17 there is also disposed a transformer 27 for measuring the voltage of the three-phase current.

The corresponding intensity and voltage signals are transmitted to the control and regulating module 20, as shown schematically by the connecting line 25.

The control and regulating module 20 is also connected to the rheostatic chopper 16 in order to ensure the control of the rheostatic chopper, as indicated by the connecting line and the arrow 28.

In a general manner, on the basis of the measurement signals of the voltage U of the current produced by the alternator and the signals of the currents I in each of the phases as well as a signal representing the speed of rotation of the rotary assembly of the wind machine comprising the rotor 8 of the alternator 7, the digital control and regulating module 20 ensures modulation of the direct current by pulses produced in the PWM rectifier 15.

As indicated above, this modulation consists of regulating the width of the direct current pulses of which the frequency remains fixed and equal for example to 1000 Hz.

This modulation of the pulse width of the direct current produced in the rectifier permits, by reaction, regulation of the amplitudes of the intensities and of the voltage of the current produced by the alternator, as well as the phase difference (p of the voltage U relative to the intensity I of the current.

Thus by modulation of the direct current produced by the rectifier it is possible to regulate the electrical operating parameters of the alternator 7, either in order to obtain ideal electrical operation of the alternator 7 or to regulate the speed of rotation co of the rotating assembly of the wind machine comprising the rotor of the alternator 7, by means of the resisting torque of the alternator.

The inverter controlled by the control and regulating unit 20 which receives a signal representing the intensities and voltages of the current at the output of the inverter 17 makes it possible to regulate, by pulse width modulation, the three-phase alternating current at the output of the inverter 17.

It should be noted that the transformation of the alternating current produced by the alternator 7 into direct current in the rectifier 15 and the subsequent conversion of the direct current into alternating current in the inverter 17 permits a complete dissociation of the conditions of production of the alternating current at the output of the alternator which depend upon the speed of the wind machine from the conditions of production of the alternating current at the output of the inverter which become totally independent of the speed of rotation of the rotating part of the wind machine. Thus it is possible to supply the network, by means of the transformer 14, with an electric current at a voltage and a frequency which are perfectly fixed, the voltage and the frequency of the current produced by the alternator being, on the other hand, essentially variable as a function of the wind driving the wind machine.

The measurement of the voltage U and of the intensity I at the output of the alternator 7 makes it possible to obtain the fluctuations over the course of time of the power which is supplied by the alternator. These fluctuations can be used in the control unit 20 in order to anticipate the control of the inverter 17 in order to limit the fluctuations of the voltage in the direct current bus 18.

The signals relating to the parameters of the three-phase alternating current supplied to the utilization network 13 and transmitted to the control and regulating unit 20 by the connecting line 25 also make it possible to envisage anticipating the regulation of the chopper as a function of disruptions of the current in the network.

The voltage in the direct current bus 18 is measured and transmitted to the control and regulating unit in the form of a signal which permits the unit 20 to control the rheostatic chopper 16 in such a way as to regulate the transmission of the direct current to the inverter 17.

In the case where the current is no longer drained in a regular manner by the network at the output of the inverter 17, the voltage increases in the direct current bus 18 and the regulating unit 20 controls the rheostatic chopper 16 in such a way as to cut off the current produced and to allow only a part of the direct current to pass, the residual current being diverted over the rheostat 29 of the rheostatic chopper 16. In this way the excess power produced by the wind machine is absorbed during a failure of the network. This regulation can be anticipated by virtue of the measurements carried out at the output of the inverter 17 and transmitted to the control and regulating unit 20.

In the course of its operation, the wind machine is controlled according to distinct successive phases of regulation, as a function of the speed of rotation of the rotary assembly of the wind machine which is itself a function of the wind speed.

For low wind speeds, up to about a maximum speed or nominal speed, that is to say from the starting speed of the wind machine for the production of electric power, which speed can be very low, up to a wind speed driving the rotary assembly at the nominal speed (defined for a given power, for example 25 rpm), the electrical parameters of the alternator are regulated and, by means of these, the speed of rotation of the rotor and of the rotary assembly and the torque on the rotor are regulated in such a way that the points of operation are situated on a perfectly defined torque/speed curve. This curve has substantially the shape of slightly inclined straight line, the torque increasing very little from the lowest speeds of rotation up to the maximum speed.

The speed of rotation of the rotary assembly comprising the rotor of the alternator can be easily regulated on the basis of the resisting torque imposed by the alternator which itself depends upon the electrical parameters of the current at the output of the alternator, these parameters being regulated by modulation of the rectifier.

We will now show how the control of the speed of rotation of the rotary assembly of the wind machine makes it possible to make the wind machine operate during this first phase in an optimal manner with maximum transmission of power as a function of the wind speed.

Figure 3A:
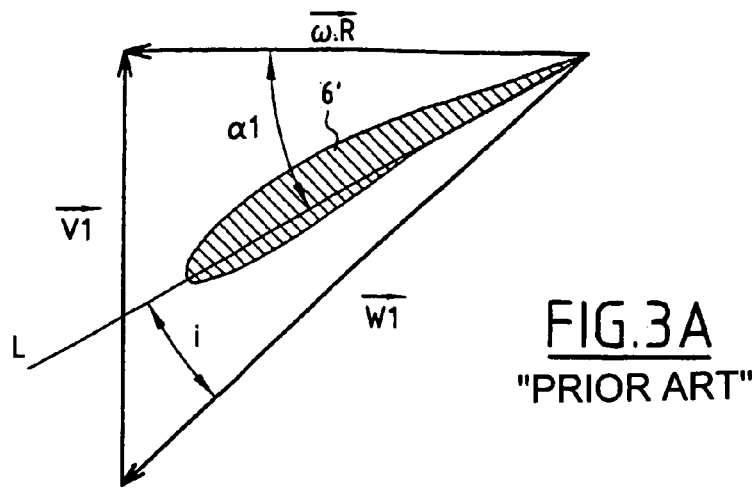
FIGS. 3A, 3B and 3C are diagrams showing the operation of a wind machine using the "pitch" system for three different wind speeds.
Figure 3B:
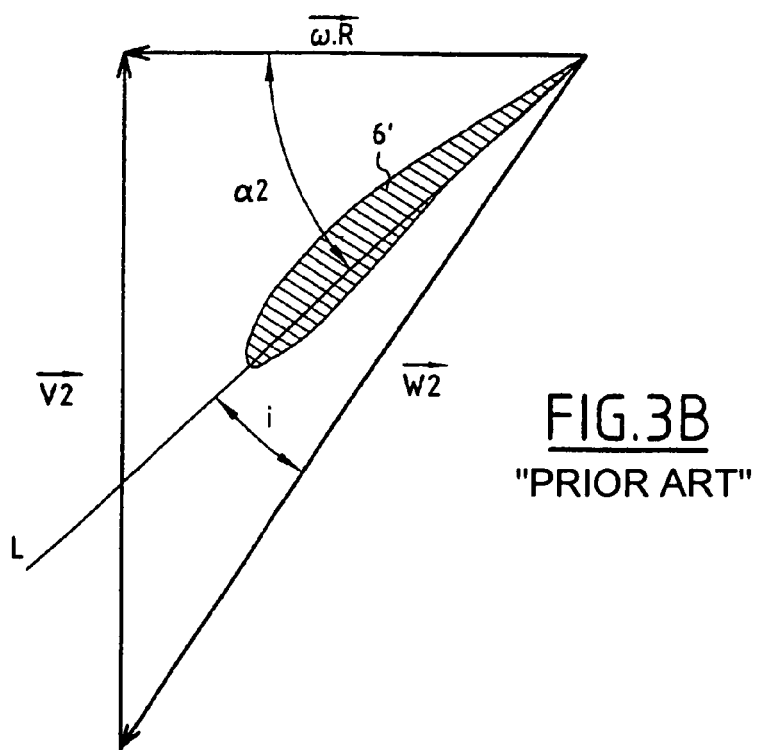
Figure 3C:
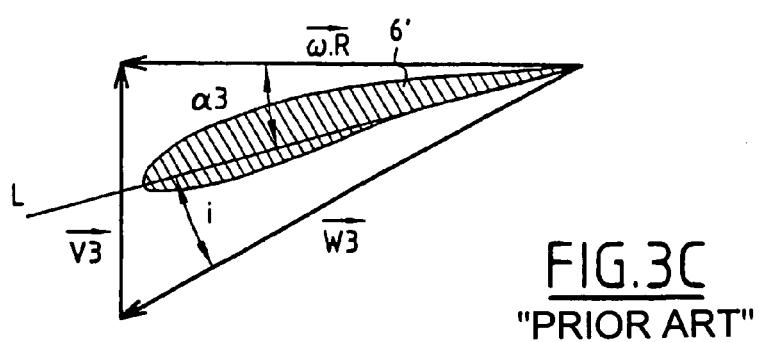

By way of comparison, FIGS. 3A, 3B and 3C show diagrams of the speed along the profile of a blade 6' of a wind machine according to the prior art comprising a rotary assembly of which the blades include a means for continuous adjustment of the setting angle.

Figure 4A:
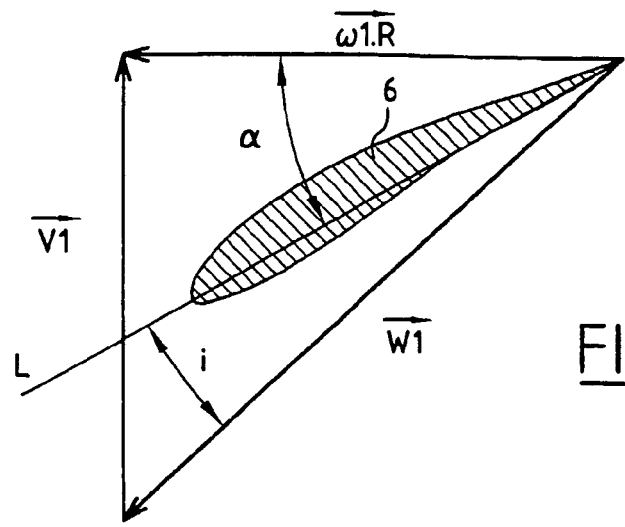
FIGS. 4A, 4B and 4C are diagrams showing the operation of a wind machine carrying out the method of regulation according to the invention for three different wind speeds.
Figure 4B:
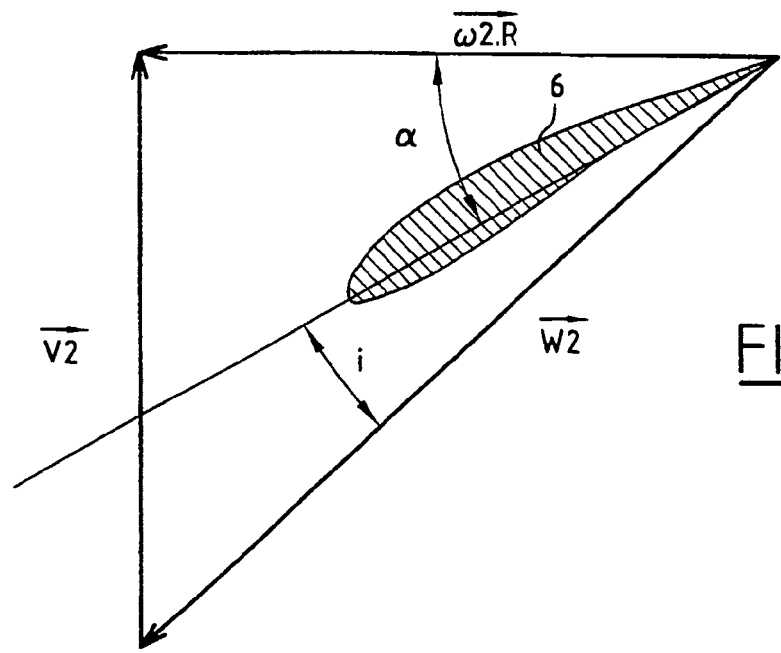
Figure 4C:
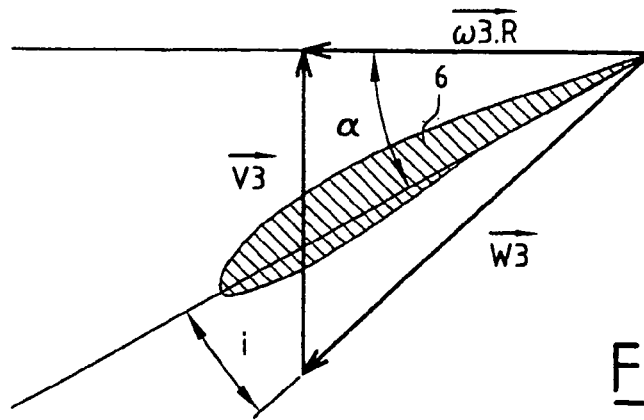

FIGS. 4A, 4B and 4C show corresponding diagrams in the case of a blade 6 mounted fixed on the rotary part of the wind machine which is regulated by the method according to the invention.

In FIGS. 3A, 3B and 3C and also in FIGS. 4A, 4B and 4C, the vectors $\vec{V}1$, $\vec{V}2$ and $\vec{V}3$ represent the wind speed to which the wind machine is subjected in the course of three phase of use, $\vec{V}1$ corresponding to an average wind speed, $\vec{V}2$ to a strong wind and $\vec{V}3$ to a slight wind.

The vectors $\vec{\omega}R$ in FIGS. 3A, 3B and 3C represent the linear speed of a blade at a distance R from the axis of rotation, or radius, for a speed of rotation ω of the rotary assembly of the wind machine, this speed of rotation ω being regulated at a constant value equal to the nominal speed of operation of the wind machine (for a given speed), regardless of the wind speed.

In FIGS. 4A, 4B and 4C the vectors $\vec{\omega 1 R}$, $\vec{\omega 2 R}$ and $\vec{\omega 3 R}$ represent the linear speeds of the blades of the wind machine regulated using the method according to the invention, in the course of three phases at average wind, strong wind and slight wind, the speeds of rotation ω1, ω2 and ω3 being modulated by control of the PWM rectifier of the power electronics module as described above.

The vectors $\vec{W}1$, $\vec{W}2$ and $\vec{W}3$ represent, both in FIGS. 3A, 3B and 3C and in FIGS. 4A, 4B and 4C, the resultant of the speeds of the wind and of the blades of the rotary assembly of the wind machine in the course of the three phases under consideration.

Figure 6:
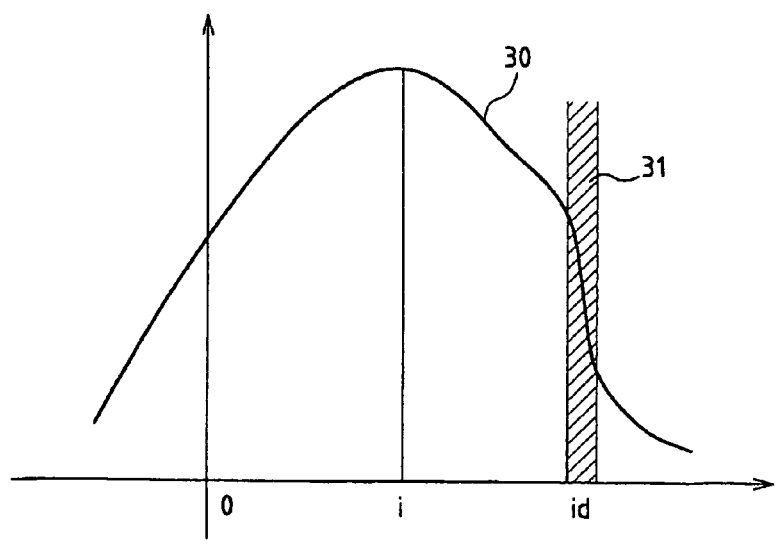
FIG. 6 is a diagram showing the variations of the coefficient of performance of a blade of the wind machine as a function of the angle of incidence of the resultant of the wind speed and of the speed of rotation of the blade.

Also shown in all of the drawings in the longitudinal direction L of the section of the blade 6 or 6', the resultant of the speed of the wind and of the blade in rotation making with the longitudinal direction L of the section of the blade 6 or 6' an angle of attack I as a function of which the performance f=Cz/Cx of the blade in question varies as shown in FIG. 6. Due to the fact that the blades are twisted, the angle (α1, α2, α3 or α) between the longitudinal direction L of the blade and the speed vector of the blade varies along the blade. Therefore the angle of attack is not constant along the length of the blade.

It will be seen in FIG. 6 that the curve 30 representing the variations in the performance f=Cz/Cx of the blade of a wind machine as a function of the angle of attack i is increasing up to an optimum value i for which the performance of the vane reaches a maximum. The performance of the vane then decreases when i increases, first of all in a moderate manner, then very rapidly, in a zone 31 corresponding to a zone of disengagement of the rotating part of the wind machine, the power supplied by the wind machine subsiding to a very low value or even practically zero.

It is therefore necessary, in order to obtain a good output of power from the rotary assembly of the wind machine, to operate with values of the angle of attack i close to the optimum value i giving the maximum performance of the blades.

In the case of a wind machine operating according to the "pitch" system with continuous adjustment of the orientation of the blades, an angle i is obtained which is substantially constant and equal to the optimum angle of attack i regardless of the wind speed (within certain limits) causing the vane to turn in one direction or the other.

When there is a change from a wind of average speed $\vec{V}1$ to a wind at high speed $\vec{V}2$ the blade 6' is made to turn in such a way as to increase the angle of the longitudinal direction L of the blade with the speed vector of the blade $\vec{\Omega}R$ (the angle passes from the value α1 to the value α2), such that the angle of attack i remains constant.

In the case where there is a change from wind at average speed $\vec{V}1$ to a wind at low speed $\vec{V}3$ the blade 6' is made to turn in such a way as to decrease the angle between the longitudinal direction L of the blade and the speed vector of the blade $\vec{\omega}R$, this angle passing from the value α1 to the value α3 in such a way that the angle of attack i remains practically constant.

An indication has been given above of the drawbacks of such a device in which it is necessary for the blades, of which the foot is mounted so as to rotate on the hub of the wind machine by way of a bearing, to be made to turn.

In the case of a method of regulation according to the invention as shown in FIGS. 4A, 4B and 4C, it is possible to regulate the speed of rotation ω and therefore the linear speed ωR of the blade as a function of the wind speed in order to keep the angle of attack i practically constant and equal to the optimum value.

In the case where there is a change from a wind of average speed V1 to a wind at high speed V2, the speed of the blade is allowed to increase up to a value ω2R which is imposed by the resisting torque of the alternator of which the electrical parameters are regulated by modulation of the direct current produced by the rectifier of the power electronics module. The value ω2R of the speed of rotation of the blade can be adjusted in such a way that the angle of attack i (and the angle α of the blade with the speed vector of the blade) remains practically constant, the angle of attack i remaining at its optimum value.

When there is a change from a wind at average speed VI to a wind at low speed V3, the speed of rotation of the rotary assembly of the wind machine is made to decrease to a value ω3R such that the angles i and a remain constant, the angle i being at its optimum value.

The reduction in the speed of the rotary assembly and of the rotating part of the wind machine is obtained by regulating the electrical parameters at the output of the alternator, by modulation of the direct current produced by the PWM rectifier, such that the resisting torque of the alternator is increased.

In the first phase of operation of the wind machine, the wind speed changes from a low value, corresponding to the wind machine starting to produce electricity, to a maximum value acceptable to the wind machine, corresponding to the nominal speed of the rotary assembly of the wind machine, and the speed of rotation of the wind machine is allowed to increase in such a way as to keep the point of operation of the blades close to the maximum of the curve of performance of the blades. As indicated above, the torque on the rotor increases slightly.

Then the nominal speed of rotation of the rotary assembly of the wind machine (for example 25 rpm) is reached, this value being obtained for a threshold value of the wind speed, the speed of rotation is regulated at a fixed value which is the nominal speed of the wind machine, and the torque then increases very rapidly once the nominal speed has been reached.

In a diagram showing the torque as a function of the speed, this phase is represented by a torque variation curve which is practically parallel to the axis of the torques and perpendicular to the axis of the speeds.

Figure 5:
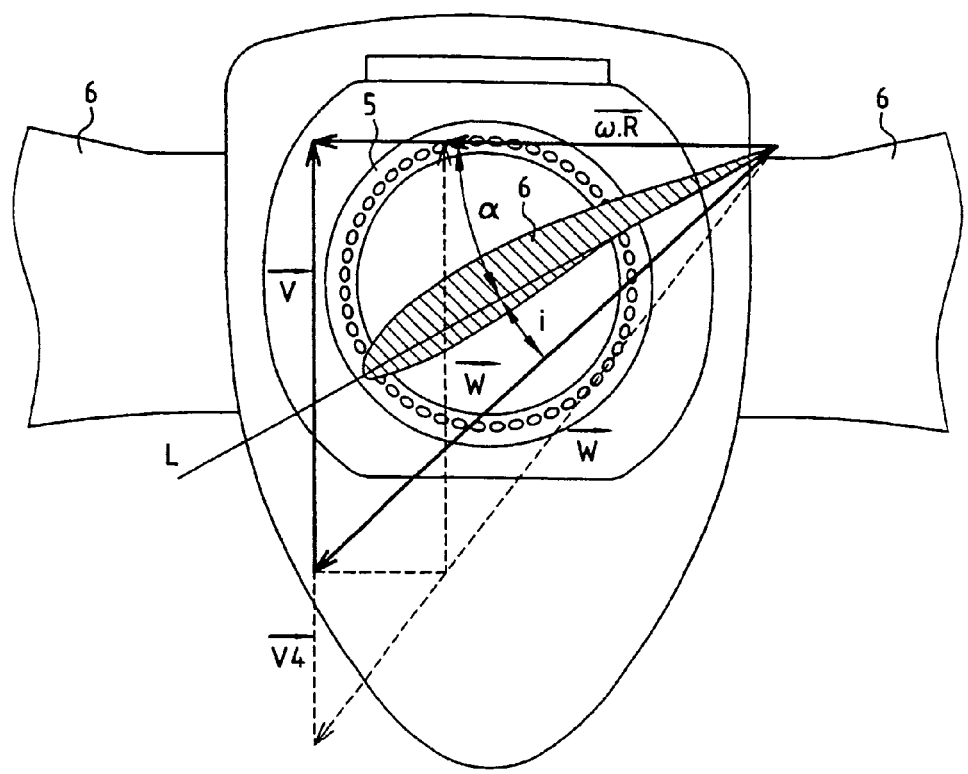
FIG. 5 is a schematic view of the rotary assembly of a wind machine and of the diagram of operation of a wind machine carrying out the method according to the invention.

With reference to FIG. 5, in which the rotating part 5, 6 of a wind machine is shown as well as the speed diagram following the section of a blade 6, it may be supposed that the vector $\vec{\omega R}$ corresponds to the nominal speed of rotation of the rotating part 5, 6 of the wind machine for the wind speed V.

If the wind speed increases beyond the value V (for example it reaches the speed V4), the speed ωR remaining constant, the angle of attack i increases up to the value $i_d$ corresponding to the disengagement on the curve of FIG. 6. In this way a stall is obtained at a wind speed which is determined by the value of the nominal speed ω. In reality, due to the fact that the angle of attack i varies with the radius R a progressive disengagement of the blade is obtained when the wind increases.

When it is wished to change the speed at which the disengagement takes place, the nominal speed of rotation ω can be modified, for example by increasing the speed of rotation in order to increase the speed of disengagement or by reducing the speed of rotation in order to reduce the speed of disengagement.

Thus a stall is obtained at variable speed by a simple modification of the control of the rectifier of the power electronics module associated with the alternator of the wind machine.

It is possible to make the nominal speed change, for example from a summer value to a winter value, without having to effect a new setting of the blades of the rotating part of the wind machine.

Thus the stall of the wind machine can be adapted to the climatic conditions and in particular it is possible to effect a change of the nominal speed of the rotary assembly of the wind machine between a summer value and a winter value, or vice versa.

FIG. 7 shows a set of curves 32a, 32b, 32c, 32d, 32e, 32f, 32g, 32h, 32i, 32j, 32k, 32l showing the variations in the mechanical power supplied by the wind machine as a function of the speed of the wind driving the rotating part of the wind machine in rotation and for imposed nominal speeds of rotation of respectively 9; 12; 15; 18; 21; 23; 24; 24.5; 24.8; 25; 25.5 and 28 rpm.

A curve 33 is also shown which corresponds to an optimized regulation of the speed of rotation regardless of the wind speed in order to obtain optimum operation of the wind machine, with a level at a nominal power of 800 kW.

In order to obtain a mechanical power of the wind machine of 800 kW (that is to say the power available over the rotating part driven by the wind), FIG. 7 shows that the nominal speed of rotation can be fixed at 24 rpm as soon as the wind speed reaches a first threshold at 9 m/sec. Between the starting speed of the rotating part and 9 m/s, the speed of rotation of the rotating part of the wind machine increases according to a well defined torque/speed curve in such a way as to optimize the power. Above the wind speed of 9 m/s the speed is regulated in order to keep it at the value of 24 rpm by modulation of the direct current obtained from the current produced by the alternator. The mechanical power supplied by the wind machine develops as a function of the wind speed, as shown by the curve 32g. It will be seen that the power of 800 kW is only obtained for two wind speeds (14 and 25 m/s). Between the speeds of 14 and 25 m/s the power drops slightly, such that a level of power at 800 kW is not obtained. It is also possible, in the second phase of operation of the wind machine, to regulate the speed of rotation of the wind machine in order to obtain a 800 kW power level. A regulation of the power is then effected at variable speed of rotation, in such a way that the mechanical power supplied by the wind machine is constant for wind speeds ranging from 11.5 to 25 m/s, as shown by the curve 33. Between the first and the second thresholds of the wind speed (9 to 14 m/s) the speed of rotation of the rotary assembly is made to increase in a progressive and regulated manner. In fact, this zone is a zone of transition between engagement and disengagement of the blades in which the wind machine must be controlled prudently. Control software is generally used, while recording the variations in the speed of rotation in order to enhance the database relating to the rises to the 800 kW power level effected on the site of the wind machine, which depend upon the climatic conditions encountered. These data are used during subsequent rises in speed and in power of the wind machine. Therefore self-adaptation is obtained.

The speed is controlled between the two wind speed thresholds in such a way as to obtain a maximum power. This control is called aggressive control. The curve 33 corresponds to the optimized operation of the wind machine for all wind speeds.

Above the second threshold of the wind speed (14 m/s), there is no longer any risk of racing of the rotary assembly and the speed of rotation is continuously adapted in order to obtain a power of 800 kW.

The method according to the invention makes it possible to adapt the speed of rotation in a very flexible manner by electronic means.

The electrical parameters at the output of the alternator 7 are regulated in such a way that the alternator has optimum operating conditions. Under these conditions the intensity i of the current of the alternator and the internal voltage or open circuit voltage E of the alternator are perfectly in phase. Thus the electrical conditions are permanently regulated in order to obtain a zero phase difference between the intensity and the internal voltage of the alternator by regulating the intensity/voltage phase difference taking account of the inductance of the alternator.

Thus the method according to the invention makes it possible, by simple regulation of the direct current produced by the PWM rectifier, to obtain ideal electrical and mechanical conditions of operation of the alternator and of the wind machine.

In the disengagement zone, the regulation of the speed by the method according to the invention may make it possible to obtain a perfectly constant power. This avoids having to oversize the wind machine in order to stand up to local power surges.

After disengagement by a stall effect at a certain wind speed, it is possible to restore the capacity of the wind machine to operate at nominal power by acting on the speed of rotation of the rotating part.

With reference to FIG. 5, an explanation can also be given as to how the normal electric stopping of the wind machine is effected, that is to say the electric braking of the wind machine between its nominal speed and a speed of substantially zero.

Assuming the wind speed V constant during the electric stopping of the wind machine, this stopping is obtained by regulating the resisting torque of the alternator in order progressively to decrease the speed ω of rotation of the rotary assembly of the wind machine.

The electric braking of the wind machine by means of the resisting torque of the alternator is obtained in a very gradual manner, by imposing a torque greater than the nominal torque in a relatively low proportion, for example of the order of 10%. By way of comparison, in the case of the earlier devices it is necessary to double the resisting torque in order to obtain an effect of braking of the wind machine from the nominal speed.

In the case of the electric braking carried out according to the invention, the stall effect is added very rapidly to the reduction in the speed by electric braking by means of the resisting torque of the alternator, in order to bring about a reduction in the power of the wind machine which changes from its nominal value to a value of practically zero.

In fact, as can be seen in FIG. 5, when the speed ω is decreased, the wind speed V being constant, the resultant $\vec{W}$ of the wind speed and of the linear speed $\vec{\omega R}$ makes an increasing angle of attack i with the longitudinal direction L of the blades of the wind machine. Thus stall conditions are obtained when the angle i reaches the disengagement value $i_d$.

The reduction in the speed ω by electric braking is effected progressively in such a way that the excess power in the network 13 connected to the wind machine can be drained without the voltage in the direct current bus 18 reaching the level of triggering the rheostatic chopper 16.

The conditions of production of three-phase alternating current by the inverter 17 from direct current are such that the parameters of the three-phase current sent over the network 13 can be regulated independently of the operation of the alternator 7 which is itself regulated by the PWM rectifier 15.

Thus it is possible to make the wind machine operate either as a conventional current generator, the cosine φ being capable of being adapted to the requirements of the operator, or as a synchronous compensator, the wind machine supplying the network 13 with a reactive power in the desired quantity in order to meet the requirements of the operator of the network 13.

This avoids placing compensating units on the network 13 in the case of a requirement for reactive current.

It should be noted that the inverter 17 operates in a manner analogous to that of the PWM rectifier 15, in the reverse direction, whereby the inverter 17 produces from a direct current by pulses supplied by the direct current bus 18 a three-phase alternating current of which the electrical parameters can be regulated from the control line 22 of the inverter connected to the control and regulating unit 20.

Because the power electronics module 12 associated with the wind machine is entirely symmetrical, and because the rectifier 15 and the inverter 17 disposed on either side of the chopper 16 can operate in a reversible manner, it is possible to use the network 13 to supply, via the transformer 14, the inverter 17 which then functions as a rectifier and supplies at its output a direct current by pulsing which is transmitted, by the bus 18 connected to the chopper 16, to the rectifier 15 which then functions as an inverter in order to supply an alternating current to the alternator 7 which then functions as a synchronous motor driving the rotating part 5, 6 of the wind machine.

When the wind machine is stopped it is possible to change its speed to a starting speed of the alternator 7 by controlling the rectifier 15 functioning as an inverter and supplied with direct current by means of the network and the inverter 17 functioning as a rectifier.

Thus it is possible to produce very flexible starting conditions with ideal coupling to the network, the operation of the wind machine and of the alternator 7 to produce electrical energy only being activated at the moment when the ideal starting speed of the alternator is reached; this speed can be relatively low because of the possibilities of control of the wind machine at variable and increasing speed during its first phase of operation in order to reach the nominal speed, as indicated above.

Thus it is possible to design blades of which the profile is created quite independently of the starting conditions of the wind machine. The blades of a wind machine generally have a cylindrical blade foot fixed on the hub and a profiled part of which the profile becomes thinner, in the longitudinal direction of the blade, as the distance from the foot of the blade increases. In order to obtain a sufficient starting torque, it is necessary to design blades of which the profiled part has a substantial width (in a radial direction such as L in FIG. 5) in the vicinity of the cylindrical part for connection to the hub.

As the wind machine can be started using the alternator as a motor, it becomes possible to use blades of which the profiled part has a smaller width in its zone close to the cylindrical part for connection to the hub. This limits the forces exerted by the wind on the blades of which the widest part in the vicinity of the cylinder for connection to the hub offers a greater resistance to the wind. The blades therefore resist strong winds better and it becomes possible to envisage lightening of the structures downstream of the blades (in particular the hub, the nacelle and the mast).

When the wind machine is stopped, the method and the apparatus for control of the wind machine according to the invention make it possible to employ an ideal means for regulating the conditions of keeping the wind machine stopped when the rotor is a rotor with permanent magnets.

The alternator including a rotor with permanent magnet has coupling means such as one or several switches which make it possible to connect the phases of the alternator to one another.

After a normal (or incidental) stopping of the rotary assembly of the wind machine, the switch is toggled such that the short-circuiting of the alternator, of which the rotor with permanent magnet continues to exert a magnetic field, produces a resisting torque which opposes a rise in the speed of rotation of the rotary assembly of the wind machine. For this reason a disengagement of the blades from the rotating part of the alternator is produced very quickly, as was explained with regard to FIG. 5. The disengagement is all the more rapid and substantial as the wind becomes stronger. Therefore the wind can only exert a very limited torque on the rotor and the rotary assembly of the wind machine, which is reflected in a rotation at very low speed of the rotating assembly. This operation at very low speed is perfectly stable due to the electric braking of the alternator and the disengagement of the blades which increases as soon as the wind becomes stronger. Therefore perfect securing of the stopping of production by the wind machine is thus obtained, and the rotary assembly then rotates at a speed substantially lower than the speed of rotation for the production of electric energy (for example two to three rpm). This slight rotation of the alternator makes it possible to avoid marking of the rolling tracks of the rotor bearing, as the turning elements of the bearing move along the entire periphery of the rolling tracks.

The very low electric power produced by the alternator during this rotation at low speed which dissipates in the windings of the stator of the alternator makes it possible to keep the alternator at temperature, which avoids any problem of condensation on the elements of the alternator, regardless of the atmospheric conditions.

The rheostatic chopper 16 placed in parallel on the direct current bus 18 connected to the output of the PWM rectifier 15 and to the input of the PWM inverter 17 makes it possible to regulate the transmission of electric power between the alternator and the network.

When the network 13 cannot drain all of the power supplied by the alternator 7, the voltage in the direct current bus 18 increases and a corresponding signal is sent by the line 24 to the digital control and regulating unit 20. The control and regulating unit 20 transmits a control signal to the rheostatic chopper via the line 28 in such a way that the rheostatic chopper cuts off the direct current and drains part of the electric power over the rheostat 29, in such a way as to balance the transmission of power between the alternator and the network.

In particular, the rheostatic chopper 16 can be used to drain the transient energy coming from the PWM rectifier in the event of a short-term failure of the network, such as a micro-cutoff lasting less than a second, or in the case of a malfunction of the inverter, or during incidental stopping of the wind machine.

In the event of a micro-cutoff appearing on the network 13, that is to say a cutoff of the network for a period typically lasting less than a second, the network can no longer drain the electric power coming from the power electronics module 12 and the voltage in the direct current bus 18 increases because the PWM rectifier continues to supply direct current obtained by conversion of the alternating current of the alternator 7.

The control unit 20 receives the information about the rise in voltage of the direct current bus 18 via the line 24 and transmits an activation command to the chopper 16 via the line 28. The chopper drains a part of the electric power which reaches it via the direct current bus 18 over the rheostat 29. The system returns to a predetermined minimum power threshold and if this power threshold is maintained the normal operation of the wind machine resumes.

If the power continues to increase above the predetermined threshold, due to the persistence of a fault in the network 13, a new operation is carried out of absorption of power in the rheostat 29 of the electrostatic chopper.

When the fault persists for a period typically lasting longer than a second, incidental stopping of the wind machine is effected.

In the event of an incident or an accident reflected in a lasting fault on the network 13 or the inverter 17, the wind machine is stopped by activation of the procedure for stopping by electric braking which was described above and by mechanical braking.

Unlike normal stopping, of which the progressive procedure can be programmed in such a way as to drain the power over the network during an incidental or accidental stoppage, the power produced by the alternator and transmitted by the rectifier is drained in the rheostat 29 of the chopper.

The braking is ensured until disengagement of the rotary assembly of the wind machine, as described previously.

The invention is not strictly limited to the embodiment which has been described.

Thus the power electronics module may comprise elements different from those indicated above, starting from the moment when this power electronics module in an intermediate phase effects the conversion of the alternating current of the alternator of the wind machine into direct current using a means of which the current can be modulated in order to regulate by reaction the electrical parameters at the output of the alternator.

The alternator of the wind machine may be different from an alternator having a rotor with permanent magnets. However, in order for the invention to be carried out the rotor of the alternator must permit torque control. The rotor can be a wound rotor having electric windings and for example produced in the form of a wound rotor of the synchronous type. In the case of a rotor with permanent magnets an additional advantage is obtained, since it is possible to effect braking of the rotating part of the wind machine on stopping.

The alternator and the wind machine can be of any type and can have any power. The method and the device according to the invention are well adapted in particular to the case of high-power wind machines and alternators, for example power close to 1 MW or higher.

The invention claimed is:

1. A method of regulating a system that produces electric power, the system including an electric alternator having a rotor integral with a rotating part of a wind machine to form a rotary assembly, and a power electronics module, the method including the steps of:

producing an alternating current at output terminals of the alternator and having electrical characteristics, including amperage, voltage, phase difference between current and voltage, and frequency;

converting the alternating current produced by the alternator into modulated pulses of direct current, wherein the electrical characteristics, including amperage, voltage, phase difference between current and voltage, and frequency, of the alternating electric current produced by the alternator are regulated, by controlling the speed of rotation of the rotary assembly by resisting torque imposed by the alternator in response to modulating the pulses of continuous current produced by the converted alternating current; wherein, when wind speed is higher than a first threshold value, the speed of rotation of the rotary assembly of the wind machine is regulated at a fixed maximum value, or a nominal value, enabling optimum recovery of power by the wind machine.

2. The method of regulating as claimed in claim 1, wherein during a first phase of operation of the system, for low wind speeds, the speed of rotation of the rotary assembly of the wind machine is made to increase in such a way that the speed of rotation passes progressively from a low starting value to a maximum value, the torque on the rotor increasing according to a predetermined law of speed/torque variation.

3. The method as claimed in claim 1, wherein during a second phase of operation of the wind machine, when the wind speed is higher than a second threshold value the maximum speed of rotation of the rotary assembly of the wind machine is regulated in such a way as to maintain the power of the wind machine at a fixed value and, preferably, at the maximum power value of the wind machine.

4. Method as claimed in claim 3, wherein, when the value of the wind speed is lower than the second threshold value the speed of rotation of the rotary assembly is made to increase in a progressive and regulated manner and the variations in the value of the speed of rotation are recorded in such a way that a curve representing the variation of the speed of rotation can be used subsequently to control the increase in speed of the rotary assembly.

5. The method as claimed in claim 1, wherein the electrical characteristics of the electric current produced by the alternator are regulated in such a way that the internal open circuit voltage of the alternator is in phase with the amplitude of the current.

6. The method as claimed in claim 1, wherein the maximum speed of rotation of the rotary assembly of the wind machine is regulated at a value permitting disengagement of the blades of the rotating part of the wind machine for a predetermined wind speed, by modulating the pulses of continuous current produced by said conversion.

7. The method as claimed in claim 1, wherein the nominal value of the speed of rotation is fixed at a value taken from amongst at least two values as a function of climatic conditions at the site of the wind machine and in particular at a first value in a summer period and at a second value in a winter period.

8. The method as claimed in claim 1, wherein the direct current is converted and used to supply an alternating current to a utilization network and that the electrical parameters of the alternating current supplied to the utilization network are regulated by control of the conversion of the direct current into alternating current.

9. Method as claimed in claim 8, wherein the regulated electrical parameters of the alternating current supplied to the network include the cosine $\phi$ and the reactive power of the current supplied to the network.

10. The method as claimed in claim 1, wherein the electric power transmitted after conversion of the alternating current into direct current and subsequent conversion of the direct current into alternating current are regulated by cutoff of the direct current transmitted between the conversion of the alternating current into direct current and the conversion of the direct current into alternating current and for diverting at least a part of the electric current through a rheostat.

11. Method as claimed in claim 10, wherein a micro-cutoff occurs on the electrical network lasting for a period less than a fixed limit, the electric current is cut off and at least a part of the current is diverted in order to drain the electric power from the alternator during the micro-cutoff of the network.

12. The method as claimed in claim 10, wherein, in the event of a cutoff of the electrical network for a period lasting longer than the fixed limit or a malfunction during alternating current production, stopping of the system for producing electric power is brought about at least partially by electric braking, based on the resisting torque, and excess electric power produced by the alternator being drained in a rheostat of the device for cutting off the direct electric current produced by the means for conversion of the alternating current of the alternator into direct current.

13. The method as claimed in claim 1, wherein the wind machine is stopped in order to change the speed of the rotary assembly from a nominal speed to a low speed of practically zero by effecting electric braking of the rotary assembly by increasing the resisting torque of the alternator by regulating the electrical parameters of the current produced by the alternator in a progressive manner, and that excess power is drained over at least a part of the network supplied by the system for producing electric current and a rheostat.

14. The method as claimed claim 1, wherein the alternator having a rotor with permanent magnets is short-circuited after shut down of the system for producing electric current, in such a way as to create a resisting torque opposing an increase in the speed of rotation of the rotary assembly in order to obtain a speed of rotation of the rotary assembly which is substantially lower than a speed of rotation during operation of the system for producing electric power.

15. The method as claimed in claim 1, wherein the starting of the wind machine is effected initially while stopped, by causing the alternator to function as a synchronous motor supplied by means of the power electronics module in such a way as to drive the rotating part of the wind machine at a starting speed of the alternator.

16. A device for regulating an installation for producing electric power comprising an electric alternator having a rotor integral with the rotating part of a wind machine in order to form a rotary assembly, a power electronics module including a means for converting the alternating current produced by the alternator into direct current, and means for measuring the amperage and voltage of the current produced by the alternator and the speed of rotation of the rotary assembly, wherein the means for conversion of the alternating current produced by the alternator into direct current is a pulse width modulating rectifier connected to a digital control and regulating unit regulating the direct current by pulses produced by the pulse width modulating rectifier as a function of the measurement of said amperage and voltage of the current produced by the alternator and said speed of rotation of the rotary assembly.

17. Device as claimed in claim 16, wherein the power electronics module also comprises a pulse width modulating inverter connected to an output part of the pulse width modulating rectifier by at least one direct current bus having an output part connected to a network utilizing an alternating current produced by the pulse width modulating inverter from the direct current, the pulse width modulating inverter being connected to the digital control and regulating unit receiving a measurement of the voltage of the alternating current supplied to the utilization network in order to regulate the electric current supplied by the pulse width modulating inverter to the network.

18. Device as claimed in claim 16, wherein the power electronics module also comprises a rheostatic chopper connected to the output part of the pulse width modulating rectifier and to a direct current input part of the pulse width modulating inverter, the rheostatic chopper being connected to the digital control and regulating unit which receives a signal representing the voltage in the direct current bus connecting the output part of the pulse width modulating rectifier to the rheostatic chopper in such a way as to control the cutoff of the electric current passing through the rheostatic chopper and the diversion of at least a part of the electric current to a rheostat during an increase in the voltage in the direct current bus.

19. Device as claimed in claim 16, wherein the rotor of the electric alternator is a rotor with permanent magnets and that the electric alternator includes means for coupling phases of the alternator to one another.

20. Device as claimed in claim 16, wherein the rotor of the electric alternator is a wound rotor and in particular a synchronous wound rotor.

21. A method of regulating an installation for producing electric power, the installation having an electric alternator having a rotor integral with a rotating part of a wind machine forming a rotary assembly, and a power electronics module, the method comprising the steps:

producing an alternating current at the output of an electric alternator and having electrical characteristics, including amperage, voltage, phase difference between current and voltage and frequency;

converting the alternating current produced by the alternator into pulses of direct current, wherein the electrical characteristics, including amperage, voltage, phase difference between current and voltage and frequency of the alternating electric current are regulated, the regulation occurring in response to controlling the speed of rotation of the rotary assembly by resisting torque imposed by the alternator by modulating the pulses of continuous current produced by the conversion means of the power electronics module resulting from the alternating electric current produced by the alternator, wherein the maximum speed of rotation of the rotary assembly of the wind machine is regulated at a value permitting disengagement of the blades of the rotating part of the wind machine for a predetermined wind speed, by modulating the pulses of continuous current produced by said conversion means.

* * * * *